United States Patent

[11] 3,592,088

| [72] | Inventor | Donald E. Welling<br>42 Anthony Wayne Terrace, Baden, Pa. 15005 |
|---|---|---|
| [21] | Appl. No. | 832,774 |
| [22] | Filed | June 12, 1969 |
| [45] | Patented | July 13, 1971 |

[54] BRAKE DISC CUTTER
3 Claims, 12 Drawing Figs.

| [52] | U.S. Cl. | 82/4 A |
|---|---|---|
| [51] | Int. Cl. | B23b 5/04 |
| [50] | Field of Search | 82/4 A |

[56] References Cited
UNITED STATES PATENTS

| 2,542,616 | 2/1951 | Barrett | 82/4 |
|---|---|---|---|
| 2,734,255 | 2/1956 | Tack | 82/4 |

FOREIGN PATENTS

| 1,378,424 | 10/1964 | France | 82/4 (.1) |
|---|---|---|---|

*Primary Examiner*—Leonidas Vlachos
*Attorney*—Victor J. Evans & Co.

ABSTRACT: A brake disc cutter used to true up distorted or scored brake discs for automotive, truck and aircraft disc brakes, and in which the method is accomplished on the brakes while they are yet on the vehicle, or on other mounting gear, and whether they are front or rear wheels of such automotive vehicle.

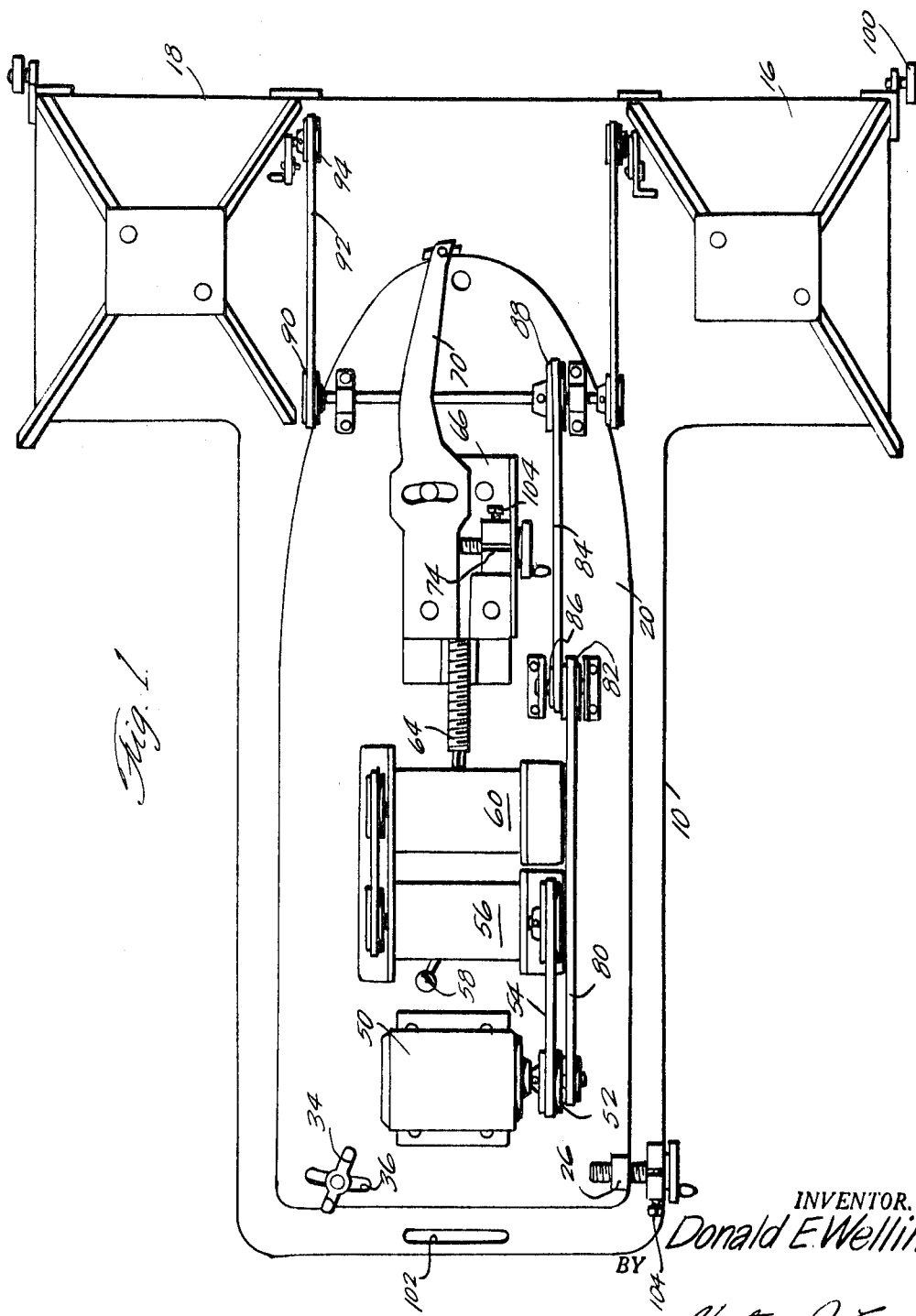

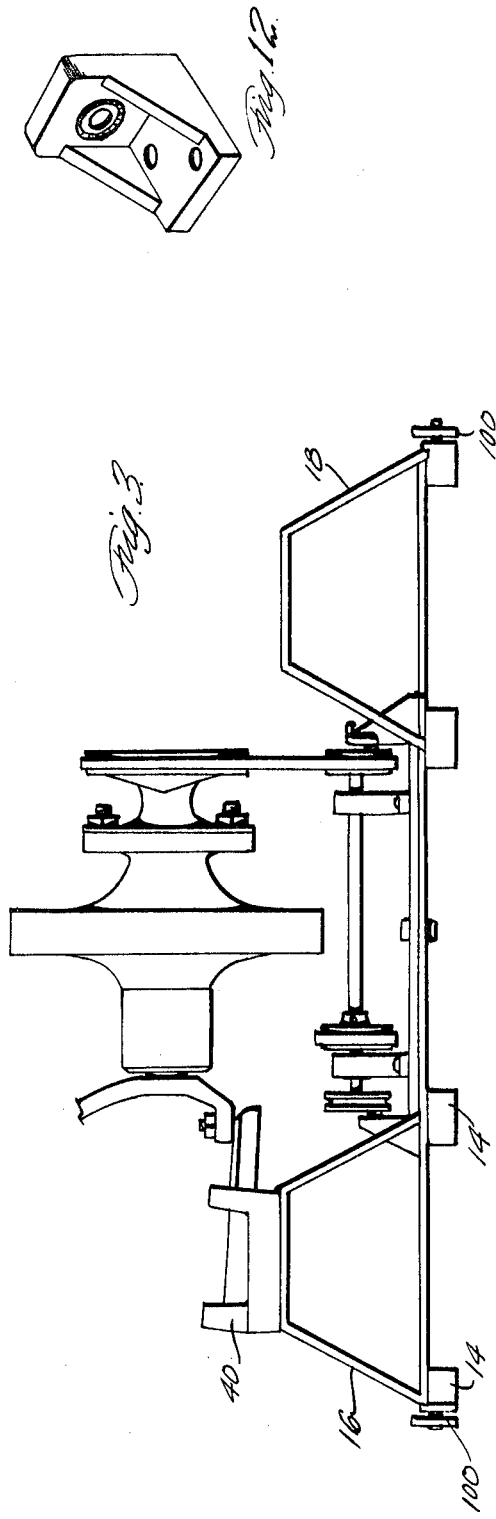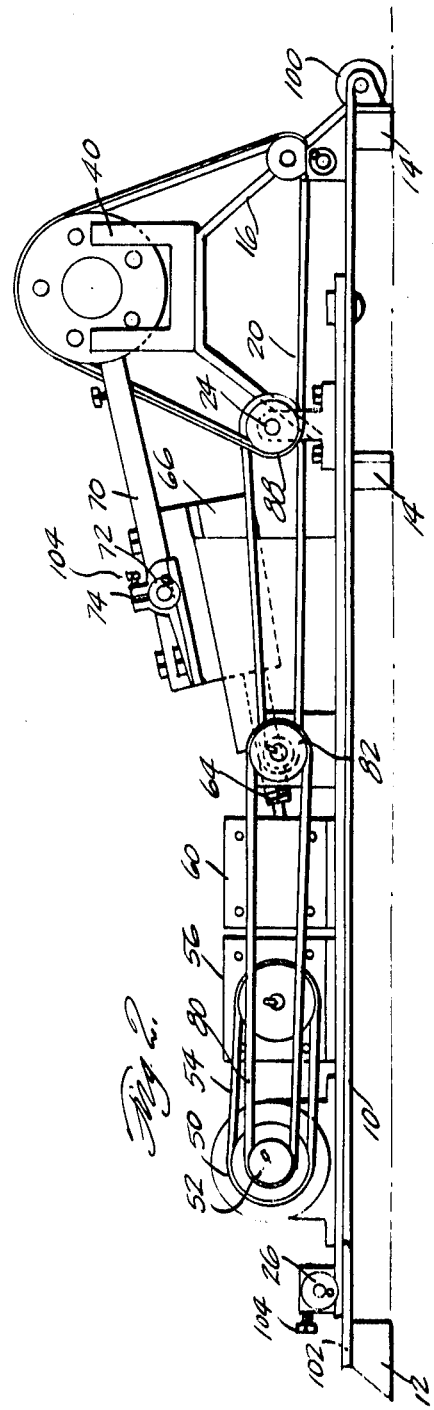

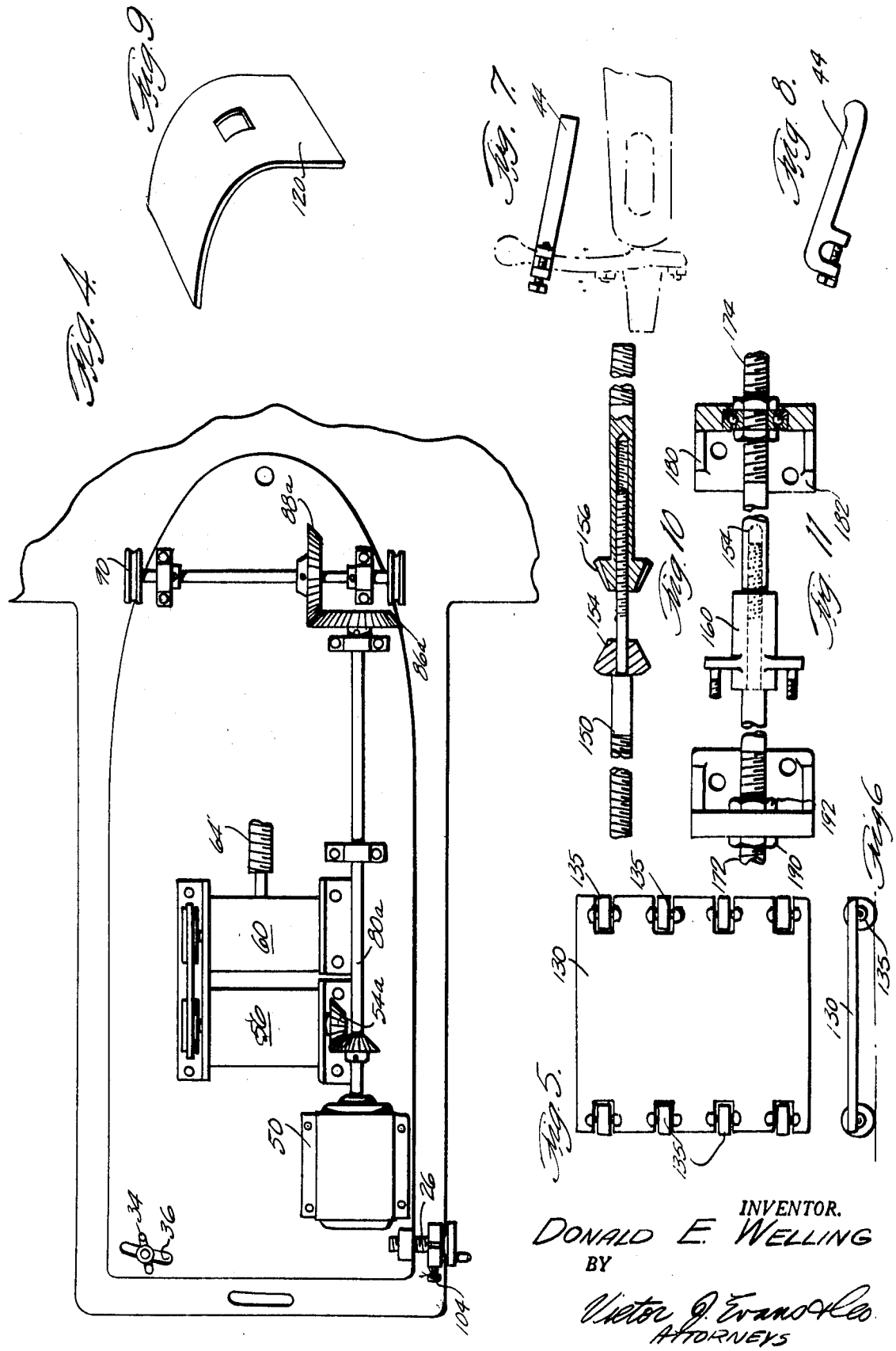

BRAKE DISC CUTTER

The present invention relates to an improved machine for truing up brake discs that have become distorted or scored by excessive and heavy usage, and in which the truing or mechanical cutting is done while the disc brakes may be mounted upon the automotive vehicle on which they are installed.

It is an object of the present invention to provide a disc cutter for disc brakes and the like which may be used on all automotive vehicles and light trucks, and in which the cutting of the disc brakes for adjustment may be done while the disc brakes are mounted on the vehicle. A larger machine may be needed for use with heavier trucks.

The above and other objects and advantages of the invention will become apparent upon full consideration of the following detailed consideration of the following detailed description and accompanying drawings in which:

FIG. 1 is a plan view of the brake disc cutter, according to the preferred embodiment and best mode of the invention;

FIG. 2 is a front elevation view of FIG. 1;

FIG. 3 is a side elevation view taken from the right side of FIGS. 1 and 2;

FIG. 4 is an enlarged view of FIG. 1 modified in which it is shown that bevel gears may be used in lieu of belt drives;

FIG. 5 shows a roller plate according to the method of the present invention to be used under the wheel opposite the one being cut to allow side movement when setting the car or automotive vehicle on the machine;

FIG. 6 is a side elevation view of FIG. 5;

FIG. 7 and FIG. 8 show details of a steering arm lock bar;

FIG. 9 shows a shield to protect the cutter side from cuttings incident to the operation and method of practicing the present invention;

FIG. 10 is a side view shown in part in cross-sectional elevation of an adapter bar for cutting discs off a vehicle, according to the preferred embodiment of the present invention;

FIG. 11 is a side, shown in part in cross section, view of the bar in a centered bearing pad mounted on top of the pedestals, in which a nut is shown on each side of the bearing for tightening the bar to the bearings to make the bar a rigid part of the machine; and FIG. 12 is a perspective view of the bearing pad shown in FIG. 11.

Referring now to the drawings, there is shown a base 10 on which there are legs 12, 14 at the rear and intermediate portions on which there are pedestals 16, 18 for supporting an automotive vehicle (not shown). A plate-carrying mechanical body 20 of a general planner construction carries the mechanical parts on the base 10 and is pivoted at the front of shaft 24 and from the rear of the base 20 by adjustment screw 26. The plate 20 is constructed to be adjustable to make allowance for any tilt of the brake disc 30 when the car is in place. When the adjustment is made by the pivot means 26, the plate 20 is locked in place with wingbolts 34 at the rear to engage firmly the base 10 with the plate 20. The wingbolts 34 are placed in slots 36.

The top pads 40 of the pedestals 16, 18 are bolted on and are made to fit the contours of lower control arms of different cars, as desired. There are pads which may be provided for the right and left sides, as well as also the front and rear. These pads must fit the control arms to align the machine with the car (not shown) on base 10. A rigid bar 44 (see FIG. 8) is used to clamp to the steering arm at the wheel and to attach the lower control arm or frame for holding the suspension straight ahead.

The working parts of the machine are on the plate 20 and are comprised of an electric motor 50 with a double sheeve pulley 52. On the pulley 52, the inside belt 54 is coupled to run a three-position transmission 56 having forward, neutral and reverse positions, as controlled by control knob 58. The transmission 56 will drive a worm gear coupler 60, having a worm gear therein, to drive cutter slide bolt 64 to move the cutter slide element 66. The cutter bar 70 has front boltholes 72 that is slotted with an adjustment slot 74 to adjust the depth of the cut desired. The cutter bar 70 and the adjustment means 74 are made to turn over to use on the inside or the outside of the disc, as desired. The outside belt 80 (see FIGS. 1 and 2) from the motor 50 will run to an adjustable pulley 82, which is on a shaft with a pulley having another belt 84 to run and drive a pulley 86 coupled to pulley 88 by the belt 84. This is adjustably arranged to tighten the second belt when both ends of the shaft are adjusted to keep it square with the machine plate 20. The disc drivebelt 84 will run over the pulley 88 and to a pulley 90 on the same shaft as 88, on which there is a further belt 92 to drive a movable pulley 94. These several pulleys are designed and constructed to be made to adapt to stud spacings of different automobiles' disc brakes, and the disc drivebelt tension of the several pulleys and connecting belts may be adjusted by the movable pulley 94 at the base of the pedestal 18.

There are four small wheels 100 mounted and at the front of the machine to be used in facilitating the handling of the base 10, and there is a handhold slot 102 at the rear of the base for lifting it up as desired. As and when the base is lifted up, by the handle opening 102, then the wheels 100 engage the surface and they are able to roll the base 10 as desired.

There are adjustment bolts described above, such as 26 and 72, 74, which are held in place by lock or lock bolts 104 to produce enough friction or drag for holding the adjustments in place, as desired.

With the use of the three-position transmission units 56, there is no need to use ratchet drives for moving the cutter bar 70 to a start position. The transmission will allow the cutter to cut in both or either direction.

There is shown in the embodiment of the drawings, specifically FIG. 4, how the arrangement can be done by using shafts and bevel gear drives, as therein shown. Other members and reference elements are shown corresponding to those of FIGS. 1—3, and where bevel elements are used, the reference number is designated with an a.

Drive elements except the brake disc drive may be shielded with a sheet metal shield, and a rubber shield may cover the cutter slide for protecting it from cuttings, a rubber shield 120, as shown in FIG. 9, being illustrative and exemplary for snapping over the cutter bar. Also within the purview of the present invention, there may be provided a small plate 130 having wheels 135 for allowing side movement under the opposite wheels from the cutter for allowing the wheel on the cutter to be lowered onto the machine. When cutting a rear wheel, the opposite wheel must be set on a jack stand so the wheel is able to turn.

There is shown in FIG. 10 an adapter bar 150 for cutting discs off the vehicle and using cones 154, 156 to center on the bearing races in the hub 160. There is within the purview of the present invention the possibility of having several sizes of cones 154, 156 to suit different size bearings.

For discs without hubs, the discs must have an adapter hub with studs which could be used to center the work. These would have to be made to fit different bolt patterns, and there is shown in FIG. 11 a bar 170 which is shown to have threaded portions 172, 174 at its ends, and is centered in the bearing pad 180, which is mounted on top of the pedestal 182. A nut on each side of the bearing shown as nuts 190, 192 is arranged for tightening the bar to the bearings, as desired, to make the bar a rigid part of the machine, as described above.

Additional embodiments of the invention in this specification will occur to others and therefore, it is intended that the scope of the invention be limited only by the appended claims and not by the embodiments described hereinabove. Accordingly, reference should be made to the following claims in determining the full scope of the invention.

What I claim is:

1. A brake disc cutter comprising a base set on legs, a pedestal disposed on said base, a plate connected to said base and carrying mechanical parts of said brake disc cutter including a motor, a transmission means driven thereby, and a cutter coupler unit connected to said transmission means, wingbolts for locking the plate to said base, drive means connected between the motor and the transmission means, a cutter slide coupler unit connected to and driven by said cutter coupler unit, and a cutter bar attached to said cutter slide coupler unit, an adjustable unit coupling the plate to the base, and means connected to said adjustable unit for securing desired adjustment.

2. The invention according to claim 1, wherein said drive means includes a belt and pulleys, and a belt and pulleys couples said transmission means with said cutter coupler unit.

3. The invention according to claim 1, wherein said drive means includes bevel gears and drive shafts and a belt and pulley couples said transmission means with said cutter coupler unit.